United States Patent [19]

Denny et al.

[11] Patent Number: 4,996,181

[45] Date of Patent: * Feb. 26, 1991

[54] AGGLOMERATE ABSORBENTS COMPRISING COPPER AND ZINC USEFUL FOR SULPHUR COMPOUNDS REMOVAL

[75] Inventors: Patrick J. Denny, Darlington; Peter Wood, Stockton-On-Tees, both of England

[73] Assignee: Imperial Chemical Industries PLC, London, England

[*] Notice: The portion of the term of this patent subsequent to Oct. 3, 2006 has been disclaimed.

[21] Appl. No.: 398,275

[22] Filed: Aug. 24, 1989

Related U.S. Application Data

[63] Continuation of Ser. No. 39,070, Apr. 16, 1987, Pat. No. 4,871,710.

[30] Foreign Application Priority Data

Apr. 25, 1986 [GB] United Kingdom ............... 8610196

[51] Int. Cl.$^5$ .................. B01J 21/08; B01J 20/06; B01J 27/232; B01D 53/02
[52] U.S. Cl. ......................... 502/414; 502/174; 502/244; 502/245; 502/341; 502/346; 502/400; 502/407; 502/415
[58] Field of Search ............... 502/174, 176, 342–346, 502/407, 414, 415, 244

[56] References Cited

U.S. PATENT DOCUMENTS

| | | | |
|---|---|---|---|
| 3,615,217 | 10/1971 | O'Brien et al. | 502/343 |
| 3,789,581 | 2/1974 | Carr et al. | 55/73 |
| 3,812,652 | 5/1974 | Carr et al. | 55/68 |
| 3,812,653 | 5/1974 | Massoth et al. | 55/68 |
| 4,111,847 | 9/1978 | Stiles | 502/342 |
| 4,263,020 | 4/1981 | Eberly, Jr. | 55/62 |
| 4,423,155 | 12/1983 | Bell et al. | 502/244 |
| 4,436,833 | 3/1984 | Broeker et al. | 502/176 |
| 4,455,286 | 6/1984 | Young et al. | 423/234 |
| 4,521,387 | 6/1985 | Broeker et al. | 502/345 |
| 4,593,148 | 6/1986 | Johnson et al. | 585/823 |
| 4,605,812 | 8/1986 | Nowack et al. | 585/845 |
| 4,871,710 | 10/1989 | Denny et al. | 502/414 |

FOREIGN PATENT DOCUMENTS

| | | |
|---|---|---|
| 891315 | 9/1953 | Fed. Rep. of Germany . |
| 743172 | 1/1956 | United Kingdom . |
| 1152738 | 5/1969 | United Kingdom . |
| 1522389 | 8/1978 | United Kingdom . |
| 1544356 | 4/1979 | United Kingdom . |
| 2037176 | 7/1980 | United Kingdom . |

OTHER PUBLICATIONS

Mixed-Oxide Sorbents for High-Temperature Removal of Hydrogen Sulfide, 1986 American Chemical Society, 6007 I.E.C. Process Design and Development 25(1986) Apr., No., 2, Washington D.C. USA, pp. 923-936-S. S. Tamhankar, M. Bagajewicz, and G. R. Gavalas-P. K. Sharma and M. Flytzanl-Stephanopoulos.
N. L. Carr and D. L. Stahlfeld, Hydrocarbon Processing, May 1985, pp. 100-102.

Primary Examiner—Paul E. Konopka
Attorney, Agent, or Firm—Cushman, Darby & Cushman

[57] ABSTRACT

Agglomerates containing oxide, hydroxides, carbonates and/or basic carbonates of copper, and zinc and/or another element such as aluminium or silicon, are useful for removal of sulphur compounds from fluids, especially under non-reducing conditions. The agglomerates have surface area above 80 $m^2.g^{-1}$ and a calcined density below 1.5 $g.cm^{-3}$. After ignition, the cupric oxide plus zinc oxide (if any) content of the agglomerates is at least 70% w/w. The proportion of the copper compound is such that the copper atoms constitute 30–97% of the total of the copper, zinc, and said other element atoms in the agglomerates.

4 Claims, No Drawings

AGGLOMERATE ABSORBENTS COMPRISING COPPER AND ZINC USEFUL FOR SULPHUR COMPOUNDS REMOVAL

This invention relates to the removal of sulphur compounds from fluid streams.

Fluids, e.g. gases such as natural gas, or liquids such as NGL or liquid refinery products, often contain a small proportion of sulphur compounds such as hydrogen sulphide, mercaptans, and carbonyl sulphide.

Removal of such sulphur compounds can be effected by passing the fluid through a bed of a suitable absorbent. It has been proposed in U.S. Pat. No. 4,521,387 to use as a sulphur-compound absorbent a composition obtained by reducing, with a hydrogen/nitrogen mixture, a pelleted calcined precipitate resulting from the coprecipitation of copper, zinc, and aluminium compounds with a base.

For many applications, e.g. oil or gas purification on an offshore rig, a source of hydrogen is not available: also such hydrogen-reduced materials tend to be pyrophoric and hence present a possible hazard if not handled with care.

We have found certain compositions that are capable of absorbing the aforesaid sulphur compounds without the need for a reduction step or for the presence of a reducing gas: indeed the compositions of the present invention are less efficient absorbents if the absorption is effected at elevated temperature in the presence of such a reducing gas.

The absorbents of the present invention comprise agglomerates of particles of an intimate mixture of oxides, hydroxides, carbonates and/or basic carbonates of (a) copper, and (b) zinc and/or at least one element X selected from aluminium, silicon, and metals of Group IIIA, Group IVA, Group VA, Group VIA and Group VIIA of the Periodic Table (as published in the "Abridgements of Patents" by the UK Patent Office).

The agglomerates are characterised by a high surface area (as measured by the BET method using liquid nitrogen) and a low density. The BET surface area is at least 80, preferably at least 100, $m^2 \cdot g^{-1}$. Typically the agglomerates have an average size within the range 1 to 10 mm. Prior copper/zinc/aluminium or copper/zinc/chromium compound agglomerates of such size, for example as used as catalysts for methanol synthesis or for the low temperature shift reaction, generally have a calcined density of at least 1.6, typically 1.8 to 2.0, $g \cdot cm^{-3}$. In contrast thereto, the agglomerates of the present invention have a calcined density of not more than 1.5 $g \cdot cm^{-3}$. By the term calcined density we mean the density of a sample of the agglomerates that have been calcined for 4 hours at 350° C. The agglomerates also have a high porosity, preferably at least 0.6, as calculated from the mercury density of the agglomerates and the weighted average of the single crystal densities of the components expressed as oxides.

Accordingly the present invention provides agglomerates capable of absorbing sulphur compounds such as carbonyl sulphide, mercaptans, and hydrogen sulphide, said agglomerates having a size in the range 1 to 10 mm;

a BET surface area of at least 80 $m^2 g^{-1}$;

a calcined density of not more than 1.5 $g \cdot cm^{-3}$; and comprising compounds of (a) copper, and (b) zinc and/or at least one element X selected from aluminium, silicon, and metals of Groups IIIA, IVA, VA, VIA, and VIIA of the Periodic Table, said compounds being in the form of oxides, hydroxides, carbonates and/or basic carbonates, in such proportions that the copper atoms form 30–97, preferably 50–95, % of the total number of copper, zinc, and element X atoms in said agglomerates; and said agglomerates having a total copper and zinc (if any) compound content such that, after ignition at 900° C., the cupric oxide plus zinc oxide (if any) content of the ignited composition is at least 70, preferably at least 80, % by weight.

The proportions of zinc and element X compounds are preferably such that the zinc atoms constitute 0 to 60, particularly at least 5, and more particularly 10 to 40, % and said element X atoms constitute 0 to 30, particularly 5 to 20, % of the total copper, zinc and element X atoms in the agglomerates.

Element X is preferably aluminium, manganese, silicon, titanium, zirconium, or chromium; and in particular is aluminium.

In order to obtain the high BET surface area, copper is preferably precipitated, or copper and zinc are preferably co-precipitated, as hydroxides, carbonates or basic carbonates. The element X compound or compounds, if used, may be incorporated by co-precipitation with the copper, or copper and zinc; and/or by mixing a separately precipitated element X compound, or compounds, with the copper, or copper and zinc, precipitate; and/or by precipitating the element X compound, or compounds, on to the copper, or copper and zinc, precipitate.

The precipitation is preferably effected using an alkali metal carbonate, particularly sodium carbonate, as precipitant. The copper, or copper and zinc, is preferably precipitated as malachite or zinc substituted malachite.

After precipitation, the composition is dried and optionally calcined, e.g. at 200° to 450° C. The dried, or calcined, precipitate is then mixed with a suitable binder, e.g. a calcium aluminate cement, phosphates, or organic materials such as starch, gums, polyvinyl alcohol, plus a little water and then granulated or extruded to give the required size agglomerates. The presence of a binder is desirable to obtain a product of adequate strength without the need for subjecting the composition to such high shaping forces that the calcined density of the agglomerates is greater than 1.5 $g \cdot cm^{-3}$.

The binder is preferably a calcium aluminate cement, i.e. calcium aluminate optionally with additional alumina. The amount of such a cement binder is preferably 5 to 10% by weight of the agglomerates. The agglomerates preferably contain some precipitated element X compound in addition to any element X compound present as a binder: element X compound as binder particles can be distinguished from element X compound as precipitate intimately mixed with the copper, or copper and zinc, compounds by microscopic examination. Preferably at least 50% of the element X atoms are present as a precipitated compound, or compounds, containing said element X atoms in intimate admixture as aforesaid with the copper, or copper and zinc, compounds. However the aforesaid proportions of copper, zinc, and element X atoms in the agglomerates include any such element X atoms present in a binder.

The agglomerates can be used for sulphur compounds absorption by passing the fluid stream from which sulphur compounds are to be absorbed through a bed of agglomerates. The bed will generally have a bulk density below 1.0, and preferably below 0.95 g cm$^{-3}$.

The absorption is preferably conducted at a temperature below 200° C. and can be at ambient temperatures, or even lower, e.g. as sulphur compounds, acid gases such as hydrogen cyanide, hydrogen halides, e.g. chloride, nitricoxide, nitrogen dioxide, chlorine, sulphur dioxide, and sulphur trioxide will also be absorbed.

The agglomerates of the invention may be used for the removal of sulphur compounds as aforesaid from any fluid stream to which the absorbent is inert. Examples of suitable fluid streams include natural gas, substitute natural gas, reforming gases, liquid hydrocarbons, air, nitrogen, argon, helium, chlorinated hydrocarbons, e.g. carbon tetrachloride, carbon dioxide, and organic compounds such as alcohols or esters.

The fluid is preferably free of reducing gases such as carbon monoxide or hydrogen, although fluid streams containing such gases may be treated if the absorption is effected at a temperature low enough to avoid substantial reduction of the copper compound to metal, for example at a temperature below 170° C., preferably below 150° C.

The invention is illustrated by the following examples.

EXAMPLE 1

A first slurry was made by mixing, at 65° C., an aqueous solution of sodium aluminate with an aqueous solution of zinc nitrate and sufficient nitric acid to bring the slurry to neutrality. A second slurry of copper and zinc basic carbonates was made by mixing, at 65° C., an aqueous solution containing copper and zinc nitrates with an aqueous sodium carbonate solution in such proportions to give a slurry of pH 6.5. The two slurries were mixed and then filtered, and the precipitate washed until sodium free. The resulting precipitate was dried at 110° C. for 16 hours and then part was calcined at 350° C. for 4 hours.

The proportions of copper and zinc nitrates and sodium aluminate were such that the relative atomic proportions of copper, zinc, and aluminium in the product were 55:27:18.

A sample of the calcined composition was then moulded into cylindrical pellets of 5.4 mm diameter and 3.6 mm height. After ignition of a sample of the pellets at 900° C, cupric oxide and zinc oxide formed a total of about 88% by weight of the composition. These pellets had a density of about 1.9 g·cm$^{-3}$ and had a BET surface area of 80 m$^2$·g$^{-1}$.

A sample of the uncalcined, but dried, precipitate was mixed with about 6% by weight of calcium aluminate cement and a little water, insufficient to give a slurry, and then granulated to give agglomerates of 1.7 to 2.5 mm size. The agglomerates were then calcined at 350° C. for 4 hours. These calcined agglomerates had an approximate copper:zinc:aluminium atomic proportion of 51:26:23, a density of 1.1 g·cm$^{-3}$, and a BET surface area of 105 m$^2$·g-1

After ignition of a sample of the calcined agglomerates to 900° C., cupric oxide and zinc oxide formed a total of about 83% by weight of the composition.

Another sample of the uncalcined, but dried, precipitate was granulated in like fashion to give agglomerates of 3 to 5 mm size. Some of the agglomerates were calcined at 350° C. for 4 hours: the remainder was dried at 110° C. The calcined agglomerates also had a BET surface area of 105 m$^2$·g$^{-1}$ and a density of 1.1 g·cm$^{-3}$. The strength of these calcined agglomerates was assessed by a crushing strength test: the mean load required to crush the agglomerates was about 2 kg. [A satisfactory strength for such particles, to avoid undue agglomerate breakage in use, is that corresponding to a mean load required to crush the agglomerates of about 1 kg.]

The absorption capability of the pellets and 3 to 5 mm agglomerates was assessed by the following technique:

Natural gas containing 5% by volume hydrogen sulphide was passed at atmospheric pressure and 20° C. down through a vertical bed of the material of height 12 cm and having a height to diameter ratio of 5 at a space velocity of 700 hr$^{-1}$ and the time, T, taken before hydrogen sulphide was detected in the exit gas was determined. Samples were then taken from different heights in each bed and analysed for sulphur content.

The results are set out in the table below.

| | Time, T, to breakthrough (min) | Sulphur content (% w/w) | |
|---|---|---|---|
| | | Maximum | top ⅔ of bed |
| pellets* | 41 | 9.5 | 5.4 |
| calcined agglomerates | 133 | 19 | 17.5 |
| uncalcined agglomerates | 170 | 24 | 23 |
| agglomerates A* | — | 14.5 | 14.2 |

*comparative. Agglomerates A are agglomerates representative of commercially available materials intended for sulphur absorption and have a BET surface area about 97 m$^2$·g$^{-1}$ and calcined density about 1 g·cm$^{-3}$, and contain copper oxide, silica, and alumina and having a copper oxide content of about 53% w/w after ignition at 900° C. The copper/aluminium/silicon atomic proportions are approximately 49:24:27.

In another test the carbonyl sulphide absorption capacity the calcined 3 to 5 mm agglomerates was assessed by the above procedure but using natural gas containing 1% by volume carbonyl sulphide and that had been saturated with water vapour at room temperature. In this test the bed was maintained at 150° C. The time to breakthrough was 665 minutes, the maximum sulphur content was 22.4% by weight and the average sulphur content of the top ⅔ of the bed was 21.3% by weight.

In another test, a bed of the 1.7 to 2.5 mm calcined agglomerates was used to absorb n-pentyl mercaptan from naphtha at 20 atmospheres pressure at a liquid space velocity of 1 hr$^{-1}$ at 160° C. The naphtha feedstock contained 368 ppm of sulphur (as n-pentyl mercaptan). The sulphur content of the effluent rose gradually over a period of 9 days to 220 ppm and then remained at that level for a further 8 days. The temperature of the feedstock was then increased to 200° C. The sulphur content of the effluent dropped to about 100 ppm and remained at that level for a further 4 days and then gradually increased until, after a total of 24 days from the start of the test it had reached 210 ppm. The test was then discontinued.

EXAMPLE 2

In this example the calcined agglomerates of size 3 to 5 mm prepared as described in Example 1 are compared with high surface area (80 m$^2$·g$^{-1}$) copper oxide-free agglomerates of similar size and comprising zinc oxide bound with about 6% w/w calcium aluminate cement for the absorption of carbonyl sulphide from natural gas that had been saturated with water at room temperature and that contained 1% v/v carbonyl sulphide. In this example the absorption procedure described in Example 1 was employed with the gas fed to the bed at differing temperatures in the range 50° to 250° C. The average sulphur content of the top half of the bed was measured when breakthrough occurred and a graph was drawn of this average value against the temperature at which the absorption was conducted. In each case the average sulphur content of the top half of the bed increased as the temperature was increased and then levelled off. From the graph, the absorption temperature required to achieve an average sulphur content in the top half of the bed of about 14.5% w/w and 22% w/w was determined. The results were as follows:

| Agglomerates* | Temperature (°C.) to achieve an average sulphur content in the top half of the bed of | |
|---|---|---|
| | 14.5% (w/w) | 22% (w/w) |
| Copper/zinc/aluminium oxide | 70 | 100 |
| Zinc oxide | 180 | 220 |

*each set of agglomerates also contains 6% w/w calcium aluminate.

It is thus seen that the agglomerates of the invention had an improved low temperature absorption capacity compared to the copper free agglomerates.

We claim:

1. Agglomerates capable of absorbing carbonyl sulphide, mercaptans, and hydrogen sulphide, and comprising particles of metal compounds bound together by a binder, whereby said agglomerates have a size in the range of 1 to 10 mm;
    a BET surface area of at least 80 $m^2 \cdot g^{-1}$;
    a calcined density of not more than 1.5 $g \cdot cm^{-3}$, as determined by measuring the density of a sample of said agglomerates after calcination for 4 hours at 350° C.; and
    a porosity of not less than 0.6;
    said agglomerates comprising an intimate mixture of
    (a) at least one copper compound and at least one zinc compound; and
    (b) at least one element X compounds, wherein element X is selected from aluminum, silicon, and metals of Groups IIIA, IVA, VA, VIA, and VIIIA of the Periodic Table,
    and wherein said copper, zinc, and element X compounds are in the form of oxides, hydroxides, carbonates and/or basic carbonates; and
    said copper, zinc and element X compounds are in such proportions that
    (i) said copper atoms form greater than 30%, the zinc atoms form at least 5%, and the element X atoms form 5–20% of the total number of copper, zinc and element X atoms in said agglomerates; and
    (ii) after ignition of said agglomerates at 900° C. thereby forming an ignited composition consisting of the constituents of said agglomerates in oxide form, the cupric oxide plus zinc oxide content of the ignited composition is at least 80% by weight.

2. Agglomerates according to claim 1 wherein the zinc atoms constitute 10 to 40% of the total number of copper, zinc and element X atoms in said agglomerates.

3. Agglomerates according to claim 1 wherein at least some of the element X is aluminum.

4. Agglomerates according to claim 1 containing an intimate mixture of precipitated compounds of copper, precipitated compounds of zinc, and precipitated compounds of said at least one element X, such that the number of element X atoms in said precipitated compounds of said at least one element X constitutes at least 50% of the total number of element X, atoms in said agglomerate.

* * * * *